United States Patent
Sullivan et al.

(10) Patent No.: US 9,901,859 B2
(45) Date of Patent: Feb. 27, 2018

(54) INLINE NON-TARGETED COMPONENT REMOVAL

(71) Applicant: RELEASE ENERGY PTY LTD, Perth, Western Australia (AU)

(72) Inventors: John Dermot Sullivan, Bicton (AU); David Stanbridge, Norfolk (GB)

(73) Assignee: RELEASE ENERGY PTY LTD, Perth (AU)

( * ) Notice: Subject to any disclaimer, the term of this patent is extended or adjusted under 35 U.S.C. 154(b) by 359 days.

(21) Appl. No.: 14/399,350

(22) PCT Filed: May 8, 2013

(86) PCT No.: PCT/AU2013/000472
§ 371 (c)(1),
(2) Date: Nov. 6, 2014

(87) PCT Pub. No.: WO2013/166550
PCT Pub. Date: Nov. 14, 2013

(65) Prior Publication Data
US 2015/0083425 A1   Mar. 26, 2015

(30) Foreign Application Priority Data

May 8, 2012  (AU) .............................. 2012901874
Apr. 9, 2013  (AU) .............................. 2013203259

(51) Int. Cl.
*B01D 53/14*  (2006.01)
*B01D 53/18*  (2006.01)
(Continued)

(52) U.S. Cl.
CPC ..... *B01D 53/1406* (2013.01); *B01D 53/1468* (2013.01); *B01D 53/1475* (2013.01);
(Continued)

(58) Field of Classification Search
CPC ...... B01D 2252/1035; B01D 2252/204; B01D 2252/20421; B01D 2252/20426;
(Continued)

(56) References Cited

U.S. PATENT DOCUMENTS 4,235,607 A * 11/1980 Kinder ............... B01D 53/1406
                                              166/267
6,881,389 B2  4/2005 Paulsen et al.

FOREIGN PATENT DOCUMENTS

EP          0180670      5/1986
JP        2010-209591    9/2010
(Continued)

OTHER PUBLICATIONS

Search report from PCT/AU2013/000472, dated Sep. 10, 2013.

*Primary Examiner* — Cabrena Holecek
(74) *Attorney, Agent, or Firm* — Greenblum & Bernstein, P.L.C.

(57) ABSTRACT

An improved method for the removal of non-targeted components from a non-targeted component containing gas stream, the method includes the steps of: (i) contacting the non-targeted component containing gas stream with a fluid solvent stream; (ii) passing the product of step i) through a co-current phase separation step to produce both a non-targeted component containing solvent stream and a partially purified gas stream; (iii) passing the partially purified gas stream product of step ii) through a mass transfer step to produce a wet gas product; and (iv) passing the wet gas product of step iii) through a final co-current phase separation step to produce a purified gas stream, wherein the method is performed in a subsea location.

16 Claims, 3 Drawing Sheets

(51) Int. Cl.
  *B01D 53/75* (2006.01)
  *C10L 3/10* (2006.01)
  *E21B 43/00* (2006.01)
  *E21B 43/16* (2006.01)

(52) U.S. Cl.
  CPC ......... *B01D 53/1493* (2013.01); *B01D 53/18* (2013.01); *B01D 53/75* (2013.01); *C10L 3/104* (2013.01); *C10L 3/106* (2013.01); *E21B 43/006* (2013.01); *E21B 43/16* (2013.01); *B01D 2252/1035* (2013.01); *B01D 2252/204* (2013.01); *B01D 2252/20421* (2013.01); *B01D 2252/20426* (2013.01); *C10L 2290/12* (2013.01); *C10L 2290/46* (2013.01); *C10L 2290/541* (2013.01); *C10L 2290/545* (2013.01); *Y02C 10/06* (2013.01); *Y02C 20/20* (2013.01)

(58) Field of Classification Search
  CPC ............ B01D 53/1406; B01D 53/1468; B01D 53/1475; B01D 53/1493; B01D 53/18; B01D 53/75; C10L 2290/12; C10L 2290/46; C10L 2290/541; C10L 2290/545; C10L 3/104; C10L 3/106; E21B 43/006; E21B 43/16; Y02C 10/06; Y02C 20/20
  See application file for complete search history.

(56) References Cited

FOREIGN PATENT DOCUMENTS

WO  2000/074816  12/2000
WO  2011/005116  1/2011

\* cited by examiner

INLINE NON-TARGETED COMPONENT REMOVAL

TECHNICAL FIELD

The present invention relates to an improved method for the removal of non-targeted components from a non-targeted component containing fluid stream. More particularly, the method of the present invention is intended to facilitate the removal of certain non-targeted components from fluid streams using an agent such as open water, seawater, produced water or other water sources.

BACKGROUND ART

Oil and gas reservoirs often contain very large volumes of carbon dioxide and many of these are located in isolated offshore locations. Due to the location and environment of such offshore gas fields and the quantity of carbon dioxide, the cost of removing and processing the carbon dioxide is significantly higher than it would be otherwise. Some of these oil and gas reservoirs also contain other non-targeted component gases such as hydrogen sulphide, non-targeted produced water and non-targeted solids such as sands which need to be separated from the produced fluid stream and further processed or sequestered.

This cost is further increased when the greenhouse effects of releasing gases such as carbon dioxide into the atmosphere are considered. Once the greenhouse gas implications and costs are taken into account it becomes apparent that systems which enable the removal and processing or sequestration of the $CO_2$ and other greenhouse gases such as $H_2S$, whilst remaining compact enough for use in offshore locations, will be most favored.

Seawater or brine has previously been considered as a possible solvent/reactant for scrubbing power station flue gases in a conventional vertical tower scrubbing process located on land. The problems associated with this particular process are the large volumes of seawater required and the associated large vessels and significant pumping power required. Further, water at sea level and atmospheric pressure has a much lower capacity to absorb carbon dioxide than that it does at higher water pressure and lower water temperature.

Whilst the use of seawater for the removal of greenhouse gases would be advantageous in offshore installations, the large size of the apparatus for conventional vertical tower scrubbing processes makes their implementation highly impractical.

Further, the offshore location provides additional problems not faced in land installations as a result of greatly reduced system footprint availability and the increased operating pressures, especially in deep water, and the challenges faced with deployment and long term operation without regular vessel inspections.

Other attempts to use liquid solvents to remove greenhouse gasses from gas streams such as WO 2000074816 have utilised counter-current absorbers. However, these to experience a number of problems. Counter-current systems are heavily limited by gas velocity, due to the fact that above a certain gas velocity, counter-current systems will flood and entrain the liquid in the gas. Additionally, the solvent used (such as amines) will typically need to be regenerated, which requires the addition of further pressure vessels associated with regeneration. It is also the case that the absorbed gas is not easily sequestered.

Conventional counter-current absorbers are also limited by the fabrication limitations associated with large vessels operating under pressure. For large vessels this is around a design pressure of 100 bar. In order to accommodate this pressure requirement, the large pressure vessels have the following significant engineering and economic impacts:
  Weight;
  High fabrication costs (as special high cost alloys are required for certain applications such as carbon dioxide);
  Large footprints, making them unsuitable for most offshore applications; and
  Large Inventory (holding costs).

There also remain safety concerns associated with the often dangerous, explosive and/or environmentally impacting inventory. In addition to the above problems, such pressure vessels cannot be safely deployed below depths of a few hundred meters.

Whilst co-current processes, such as those taught by EP 0180670, have been developed, these rely on atomised liquid droplets to perform the mass transfer function. Generally the efficiency of the mass transfer step is increased as the droplet size is decreased, as a higher liquid surface area contact is achieved with many small droplets as opposed to fewer larger ones. This type of process however does require a large vessel diameter to carry out the mass transfer process in order to prevent the droplets from coalescing together. According, these processes to suffer the aforementioned limitations.

Additionally the counter-current and co-current processes such as taught by WO 2000074816 and by EP 0180670 are not suitable for separating non-target liquids, such as water from the fluid streams produced at oil and gas reservoirs and non-target solids such as produced sands.

One object of the present invention is to provide a method for the removal of non-targeted components from targeted gas streams which can be utilised in the confined conditions of typical offshore or subsea locations. A further object is that the problems associated with increased operating pressures, deployments and the need for regular vessel inspections will be significantly reduced.

The preceding discussion of the background art is intended to facilitate an understanding of the present invention only. It should be appreciated that the discussion is not an acknowledgement or admission that any of the material referred to was part of the common general knowledge in Australia or any other country or region as at the priority date of the application.

Throughout the specification, unless the context requires otherwise, the word "comprise" or variations such as "comprises" or "comprising", will be understood to imply the inclusion of a stated integer or group of integers but not the exclusion of any other integer or group of integers.

Throughout the specification, unless the context requires otherwise, the term "gas", will be understood to be predominantly gas although it may contain some liquids and/or some solids.

Throughout the specification, unless the context requires otherwise, the term "liquid", will be understood to be predominantly liquid although it may contain some gas or gases and/or some solids.

Throughout the specification, unless the context requires otherwise, the term "greenhouse gases", will be understood to include any one or more of $CO_2$, $H_2S$, CO, HCl, $CH_4$, $N_2O$, $CCl_2F_2$, $CHClF_2$, $CF_4$, $C_2F_6$, $SF_6$ and $NF_3$.

Throughout the specification, unless the context requires otherwise, the term "inline process", will be understood to include any process in which the elements of the process are pipe and comply with piping requirements. It will be understood that inline processes are not limited to those which are horizontal or in a straight line, but may include elements of any orientation including vertical elements.

Throughout the specification, unless the context requires otherwise, the terms "solvent" and "reactant", will be understood to include any suitable fluid which can be any one or more of water, seawater, treated water, open source water, brine, and other aqueous and non-aqueous absorbents for gases including $CO_2$ and other gases.

Throughout the specification, unless the context requires otherwise, the term "fluid", will be understood to include any combination of gases, liquids and fluidised solids, including natural gas, condensate, oil and other hydrocarbons, water and sand.

Throughout the specification, unless the context requires otherwise, the term "non-targeted component", will be understood that or those components not desired to be present above certain levels in the target fluid stream produced after passing through the invention.

Throughout the specification, the term "non-targeted" should not be construed to mean of no commercial value. The non-targeted components may have significant commercial value. The terms "non-targeted" and "targeted" are used to distinguish one component or combination of components from another component or combination of components.

Throughout the specification, unless the context requires otherwise, the term "purified gas", will be understood to mean gas with a reduced level of non-targeted components.

Throughout the specification, unless the context requires otherwise, the term "wet gas", will be understood to mean gas after the solvent has been added into it.

Throughout the specification, unless the context requires otherwise, the term "dry gas", will be understood to mean gas after the bulk of the solvent has been separated from it.

Throughout the specification, unless the context requires otherwise, the term "rich", will be understood to mean containing a high level of non-targeted component.

Throughout the specification, unless the context requires otherwise, the term "lean", will be understood to mean containing a low level of non-targeted component.

SUMMARY OF INVENTION

In accordance with the present invention there is provided an improved method for the removal of non-targeted components from a non-targeted component containing gas stream, the method comprising the steps of:
i) contacting the non-targeted component containing gas stream with a fluid solvent stream;
ii) passing the product of step i) through a co-current phase separation step to produce both a non-targeted component containing solvent stream and a partially purified gas stream;
iii) passing the partially purified gas stream product of step ii) through a mass transfer step to produce a wet gas product; and
iv) passing the wet gas product of step iii) through a final co-current phase separation step to produce a purified gas stream.

In one form of the present invention the wet gas product of step iii) is passed through at least one further combination of an inline co-current phase separation step and an inline mass transfer step before proceeding to step iv).

In one form of the present invention, the method further comprises the step of:
Separating the non-targeted component containing gas stream from a fluid stream by way of an initial co-current phase separation step in order to separate any residual liquids or solids,
prior to the step of:
Contacting the non-targeted component containing gas stream with a liquid solvent stream Preferably, the separated liquids and solids may undergo further phase separation to separate produced water and/or sand before the targeted liquids are sent downstream for further processing and/or collection.

Preferably, the non-targeted components are carbon dioxide, hydrogen sulphide and/or other greenhouse gases.

Preferably, the co-current phase separation step, the mass transfer step and the final co-current phase separation step are all inline processes.

Preferably, the inline co-current phase separation step ii) comprises passing the solvent containing gas stream through an inline co-current phase separation apparatus to separate the gas stream from the non-target component containing fluid solvent.

Preferably, the inline mass transfer step iii) comprises passing the gas stream through an inline mass transfer apparatus, in which it is contacted with a fine spray of additional fluid solvent.

Preferably, the fluid solvent is high pressure water. More preferably, the fluid solvent is an open water source. Still preferably, the fluid solvent is sea water or high pressure produced water. The water is preferably drawn from locations which contain low levels of non-targeted components and releasing the component rich water at deep levels where solubility is higher.

Preferably, the fluid solvent is low temperature, high pressure water. Still preferably, the fluid solvent is low temperature, high pressure open source water, sea water or produced water. Still preferably, the water is drawn from locations which contain low levels of non-targeted components.

Preferably, fresh (uncontacted) fluid solvent is introduced at each stage to maximize each mass transfer stage's efficiency.

In a further embodiment of the present invention, the non-targeted component containing gas stream is contacted with low temperature, high pressure water, whilst the partially purified gas stream of step (iii) is contacted with an alkylamine. Preferably, the alkylamine is selected from a group containing monoethanolamine (MEA), diethanolamine (DEA), methyldiethanolamine (MDEA), diisopropylamine (DIPA) or diglycolamine (DGA).

Preferably, the non-targeted component containing solvent is released in deep water areas, so that the non-targeted components may be sequestered. Still preferably, the non-targeted component containing solvent is progressively released over a length of pipeline or injected into a suitable surface reservoir for enhanced oil recovery and/or sequestration.

Preferably, the non-targeted component containing fluid solvent may be injected into a natural reservoir for sequestration purposes and/or enhanced oil and/or gas production purposes.

In a further embodiment of the present invention, the solvent separated at each inline co-current phase separation step may be passed through a regeneration step, so that it may be recycled for use in the inline mass transfer step iii).

In a further embodiment of the present invention the solvent is passed through inline separation devices to remove solid non-targeted components from the solvent prior to being contacted with the gas stream.

In accordance with the present invention there is further provided an improved method for the production of methane from methane hydrate reserves, the method comprising the steps of:
 i) contacting a non-targeted component containing gas stream with a fluid solvent stream;
 ii) passing the product of step i) through a co-current phase separation step to produce both a non-targeted component containing solvent stream and a partially purified gas stream;
 iii) passing the partially purified gas stream product of step ii) through a mass transfer step to produce a wet gas product;
 iv) passing the wet gas product of step iii) through a final co-current phase separation step to produce a purified gas stream; and
 v) injecting the non-targeted component containing solvent stream into a methane hydrate reserve to produce methane and a hydrate.

Preferably, the non-targeted component present in the non-targeted component containing gas stream includes $CO_2$.

Preferably, only the concentrated the non-targeted component containing solvent stream of stage (ii) is injected into the methane hydrate reserve.

In one form of the present invention, the method further comprises the step of:
 Separating the non-targeted component containing gas stream from a fluid stream by way of an initial co-current phase separation step in order to separate any residual liquids or solids,
prior to the step of:
 Contacting the non-targeted component containing gas stream with a liquid solvent stream In accordance with the present invention there is still further provided a means for the removal of non-targeted components from a fluid stream which have been dissolved in a fluid solvent, the means comprising:
 i) an initial co-current phase separation apparatus;
 ii) an mass transfer apparatus; and
 iii) a final co-current phase separation apparatus,
whereby a purified gas stream and a non-targeted component rich solvent stream are produced.

Preferably, the initial co-current phase separation apparatus, the mass transfer apparatus and the final co-current phase separation apparatus are arranged in series. Still preferably, they are all inline with the fluid stream.

In one form of the present invention there is provided at least one further combination of inline co-current phase separation apparatus and inline mass transfer apparatus before the final inline co-current phase separation apparatus.

Preferably, the non-targeted components are carbon dioxide, hydrogen sulphide or other greenhouse gases.

Preferably, the fluid solvent is low temperature, high pressure water. More preferably, the fluid solvent is low temperature, high pressure open source water, sea water or produced water. Still preferably, the water is drawn from locations which contain low levels of non-targeted components and the non-targeted component containing water is released at deep levels where solubility is higher.

Preferably, the non-targeted component containing fluid solvent may be injected into a natural reservoir for sequestration purposes and/or enhanced oil and/or gas production purposes.

Preferably, the non-targeted component containing solvent is progressively released over a length of pipeline.

In a further form of the present invention, the separated solvent product of each inline co-current phase separation apparatus may be passed through regeneration apparatus, so that it may be recycled for use in the inline mass transfer apparatuses.

BRIEF DESCRIPTION OF THE DRAWINGS

Further features of the present invention are more fully described in the following description of several non-limiting embodiments thereof. This description is included solely for the purposes of exemplifying the present invention. It should not be understood as a restriction on the broad summary, disclosure or description of the invention as set out above. The description will be made with reference to the accompanying drawings in which.

DESCRIPTION OF EMBODIMENTS

Figure 1:
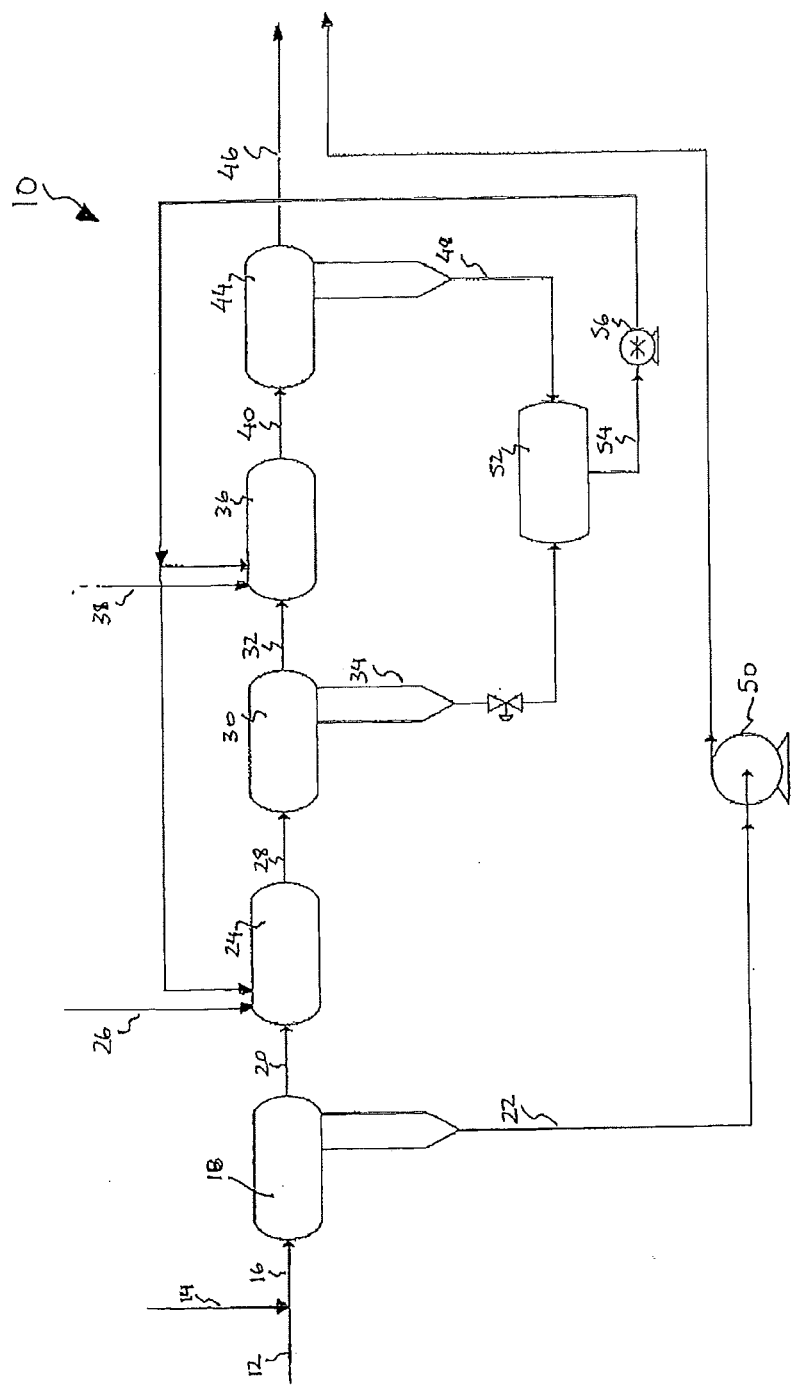
FIG. 1 is a schematic representation of a flow sheet depicting a method for the removal of non-targeted components from a gas stream in accordance with the present invention.

In FIG. 1 there is shown a method 10 for the removal of non-targeted components from a fluid stream, for example either atmospheric or non-atmospheric gas streams. In general terms, the method 10 utilises a high pressure, low temperature open water source as a solvent in order to remove greenhouse gases from a gas stream.

A gas or multi-phase fluid stream 12 may be combined with one or more other gas or multi-phase fluid streams 14 to produce a combined multi-phase fluid stream 16. The combined multi-phase stream 16 is then directed to a first co-current phase separation apparatus, for example an inline co-current phase separation apparatus 18, wherein the combined multi-phase stream 16 is separated into a predominantly gas stream 20 and a predominantly liquid stream 22. The predominantly gas stream 20 is then directed to a first mass transfer apparatus, for example an inline mass transfer apparatus 24, where it is spray contacted with a solvent stream 26 to produce a mixed phase stream 28.

The mixed phase stream 28 is then directed to a second co-current phase separation apparatus, for example an inline co-current phase separation apparatus 30, wherein the mixed phase stream 28 is separated into a gas stream 32 and a solvent stream 34.

The gas stream 32 is then directed to a second mass transfer apparatus, for example an inline mass transfer apparatus 36, where it is spray contacted with solvent stream 38 to produce a mixed phase stream 40.

The mixed phase stream 40 is then directed to a final co-current phase separation apparatus, for example an inline co-current phase separation apparatus 44, wherein the mixed phase stream 40 is separated into a purified gas stream 46 and a solvent stream 48. The purified gas stream 46 then can be piped or otherwise transported for storage and/or further processing.

The predominantly liquid stream 22 is then directed for downstream transportation which can include for injection into a reservoir or piping for storage and/or further processing and this may be facilitated by pump means 50 as required.

If the solvent is to be regenerated rather than released or sequestered Solvent streams 34 and 48 may be passed to regeneration means 52 which may involve de-pressurization with release of non-targeted components to produce a regenerated solvent stream 54. The regenerated solvent stream 54 is directed for use at inline mass transfer apparatuses 24 and 36 by way of pumping means 56.

The method 10 of the present invention as hereinbefore described is a two stage method. It is envisaged that the number of phase separation/mass transfer steps may be increased or decreased to one mass transfer step and one phase separation depending on the composition of the flow streams and the level of separation required.

It is further envisaged that whilst highly applicable to natural gas and also oil and/or condensate and natural gas streams, the method of the present invention may be used for the removal of carbon dioxide and other greenhouse gases from the coal seam gas streams, biogas streams, steel works, power station flue gases and other gas or fluid streams, including from the atmosphere, where these gas or fluid streams contain undesirable levels of non-targeted components and where a suitable solvent, such as a high pressure, low temperature water source, is available in sufficient quantities.

It is further envisaged that the method of the present invention may be used for the removal of any targeted component from any fluid containing the targeted component where there is a suitable solvent for the targeted component.

Figure 2:
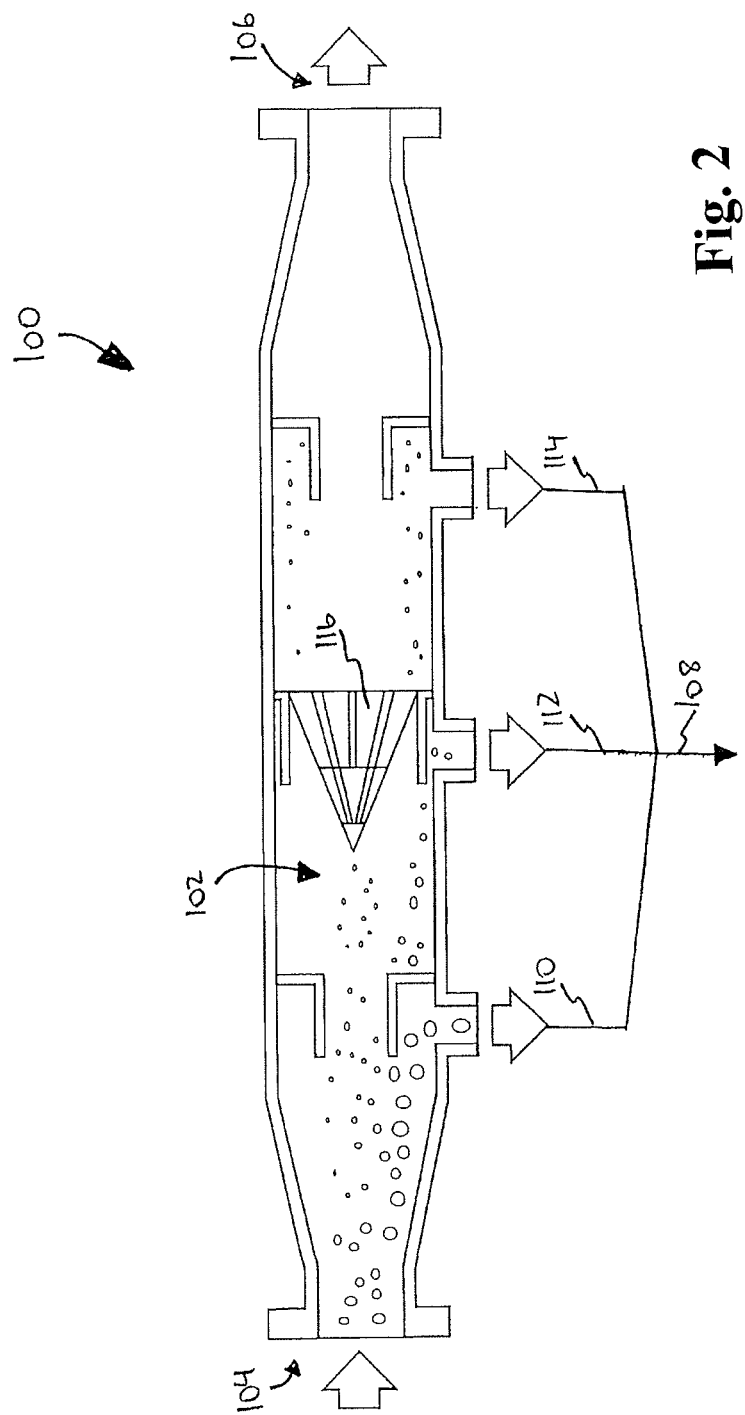
FIG. 2 is a cross sectional view of an inline co-current phase separation apparatus in accordance with the method of FIG. 1.

In FIG. 2 there is shown an inline phase separating apparatus 100 for use in a method for the removal of non-targeted components from a gas stream, for example atmospheric or non-atmospheric gas streams. The inline phase separating apparatus 100 utilises cyclonic separation to generate high G-forces in order to separate liquid from a gas stream.

The inline phase separating apparatus 100 comprises a main separation section 102 in which the liquid is extracted from the wet gas stream entering at the wet gas inlet 104 to produce a predominantly single phase gas stream at the dry gas outlet 106. The separated liquid is directed to a liquid outlet stream 108 by way of liquid drains 110, 112, 114. Therefore the unit is fully capable of producing two predominantly single phase outlet streams from one multiphase inlet stream. Upon entering the main section 102, the wet gases velocity is decreased due to the increase in the pipe's cross section. This allows large liquid particles to drop to the bottom of the vessel due to gravitational effects and such may be drained from the unit by way of liquid drain 110. The remaining gas, which contains a fine mist of liquid particles, then proceeds through a cyclonic spinner 116. This forces the gas to spin, which will act to agglomerate the smaller liquid droplets and force them to the outer edge of the flow stream due to their increased mass over the gas particles. This allows the droplets to be caught radially and drained from the vessel by way of liquid drains 112 and 114. The remaining dry gas then exits the separator by way of dry gas outlet 106.

The inline phase separating apparatus 100 may be manufactured from suitable materials including any material used in offshore applications and is also suitable for subsea installation. If sand is expected, erosion can be prevented by applying a coating such as tungsten carbide.

The inline phase separating apparatus 100 may accommodate both thin and thick liquid films through the use of a gas recycle loop (not shown). Thin liquid films are on the wall of the cyclone are generated by low liquid loadings and as a result of the friction with the cyclone' wall they have a low momentum.

As the gas approaches the gas outlet cone of the cyclone it has to constrict and as a consequence a local "negative" pressure field is set up in addition to a gas recirculation. This in combination with the low liquid film momentum leads to an accumulation of the liquid, which subsequently leads to increased liquid carryover from the cyclone. By adding the recycle the "negative" pressure fields and gas recirculation zones are not formed as the gas is allowed to flow in the annulus between the gas outlet and the wall of the cyclone.

The use of the gas recycle loop is not required for higher liquid loading as the thin film effect will not be as problematic. Due to the increased quantities of the liquid required for the mass transfer process of the present invention it is envisaged that the liquid loadings will be typically high and that the gas recycle loop will not be required during normal operation.

Figure 3:
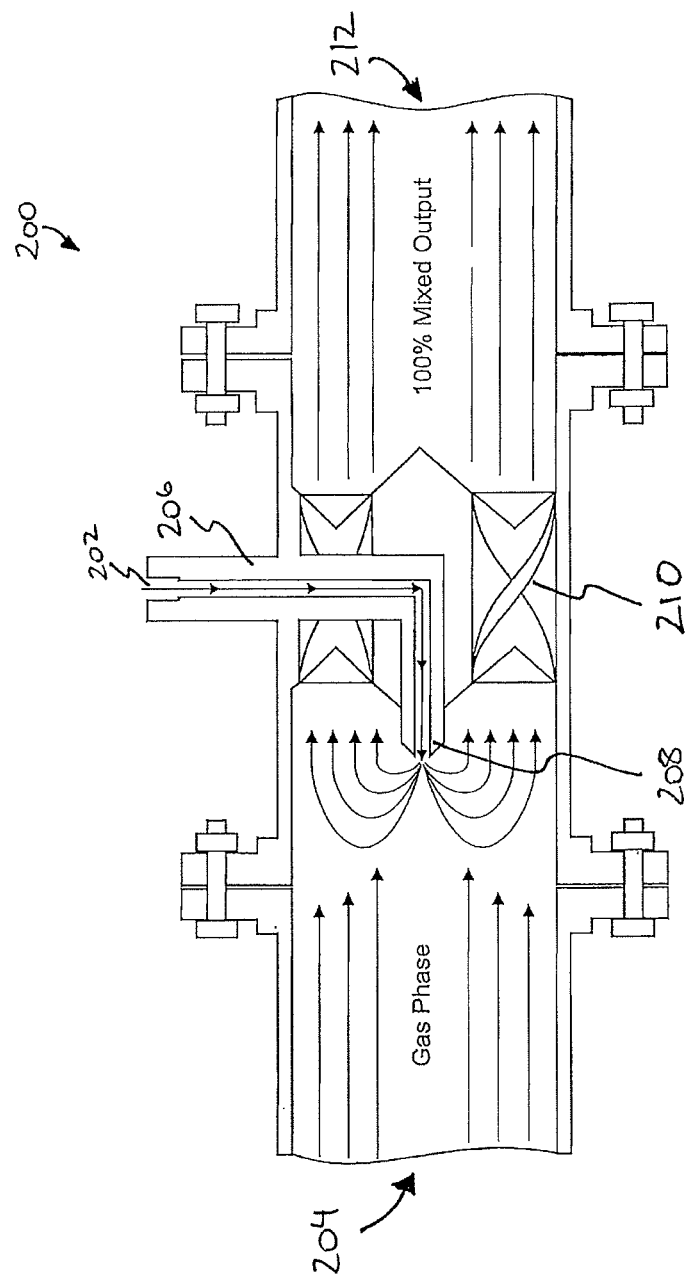
FIG. 3 is a cross sectional view of an inline mass transfer apparatus in accordance with the method of FIG. 1.

In FIG. 3 there is shown an inline mass transfer apparatus 200 for use in a method for the removal of non-targeted components from a gas stream, for example atmospheric or non-atmospheric gas streams. The inline mass transfer apparatus 200 introduces a smaller liquid phase 202 into a gas stream 204 through a liquid injector pipe 206 that discharges a fine spray of the liquid phase 202 by way of a liquid spray nozzle 208. This ensures the uniform introduction of the liquid phase 202 into the gas stream 204. The liquid and gas phases are contacted by static mixing elements 210. Fine liquid stream 202 droplets are developed by the high velocity gas/liquid streams resulting in a greater amount of liquid phase 202 surface area exposed to the gas phase stream 204. The static mixing elements 210 produce a mixed phase output stream 212.

The use of static mixer elements 210 provides increased mass transfer between the liquid phase 202 and the gas stream 204. The pressure drop is also minimized due to parallel paths offered to the static mixing elements 210. The decreased pressure drop lowers the required horsepower, average requirements and therefore utility costs. It is envisaged that the mixing elements 210 may be removed and through the use of fine droplets, similar mass transfer efficiencies may be achieved.

It is further envisaged that the removed non-targeted components may be sequestered in deep water areas, where solubility is higher than at sea level. The non-targeted components may further be sequestered as a gas hydrate in deep water, by injecting the non-targeted component gas into methane hydrate reserves. In doing so the non-targeted component gas molecules, for example $CO_2$ with or without additional non-targeted components will exchange with the methane in the hydrates, forming for example a $CO_2$ hydrate, and thereby releasing methane from the methane hydrate reserves.

The process of the present invention may be implemented in a variety of locations in the overall process of an upstream oil and/or gas production facility. However, it is envisaged that there are two main locations where this technology is most likely to be employed, being subsea and/or on a topsides facility such as a platform or floating production vessel.

System Configurations

It is envisaged that the method and apparatus of the present invention may be implemented in a number of advantageous configurations. These include:

Transmission Pipelines

In such a configuration the method and apparatus of the present invention is implemented in the form of transmission line which may supplement already established pipeline used to transport gas streams. Such a configuration provides a pipeline that has multiple injection point by which fresh or lean fluid solvent streams may contact the non-targeted component rich gas stream. Downstream from such injection points there are provided separation/extraction points for the non-targeted component rich solvent stream. Given that such transmission pipelines extend across large distances, the contact time of the non-targeted component containing gas stream and the fluid solvent stream is extended, thus substantially improving the absorption of the non-targeted components into the fluid solvent.

Modular Systems

In such a configuration the method and apparatus of the present invention are configured in the form of a compact modular multi-stage inline pipe based system. In such a configuration it is envisaged that the apparatus would comprise vertical orientation stages, followed by subsequent separation/extraction stages. In such a configuration, the apparatus of the present invention may be implemented in environments where space is limited, such as an offshore oil rig. The modular design of apparatus may be inserted in line with existing equipment on site.

The method of the present invention may implemented in a number of locations on an existing topsides facility, the following location is provided by way of example:

Immediately Upstream or Downstream of the Topsides Chokes

The benefit of this location is to reduce the gas loading to the downstream processes. For example, one of these processes could be gas drying through the use of MEG or TEG. Alternatively, in the case of an existing facility the total production throughput of the platform may be increased.

High Pressure Solvent

The performance of the system is greatly improved when the pressure of the fluid solvent is increased, the temperature is lowered and the the concentration of the component to be absorbed is low. Thus to improve the efficiency of the process it is envisaged that the inclusion of an apparatus, such as a pump, to increase the pressure of the fluid solvent may be included. When operating in subsea environments, the fluid solvent is preferably obtained from deep water sources. Such deep sources, such as deep ocean water, are high pressure, low temperature and have a low carbon dioxide concentration.

If implemented subsea, it is expected this will be between the wellhead and the topside facility chokes. Ideally it would be located as close to the well head as possible to minimise slugging flow entering the initial stage of separation. This will provide additional benefits of improved liquid from gas separation and a reduced line pressure drop.

When locating the unit subsea, except where seawater is utilised as a solvent, it is likely that the regeneration of the solvent/reactant that is selected may need to be handled on a topside or onshore facility.

The process and associated apparatus of the present invention has a number of advantages over the prior art.

Importantly, the pipelines are able to be fabricated to operate safely at pressures of over 200 bar and as such, can be deployed below depths of 1000 m below sea level. Accordingly, the aforementioned advantages of utilising high pressure deep ocean water can be achieved. Typically the absorbed gas may also be sequestered directly into seawater at deep sea levels or injected in storage reservoirs, thus preventing their release into the atmosphere.

As the method of the present invention is an inline process, it is far less limited by gas velocity than counter-current systems. Advantageously, the inline process may not require the regeneration of the solvent. As opposed to conventional systems incorporating large pressure vessels the compact inline systems utilised in the present co-current process are characterised by:

light weight lower fabrication costs small footprints small inventory (reduced holding cost and improved safety)

overall improved safety; and a low inspection and regulation regime in comparison with pressure vessels.

Modifications and variations such as would be apparent to the skilled addressee are considered to fall within the scope of the present invention.

The invention claimed is:

1. A method for the removal of non-targeted components from a non-targeted component containing gas stream, the method comprising the steps of:
   i) contacting the non-targeted component containing gas stream with a fluid solvent stream obtained from a subsea source and producing a contacted non-targeted component containing gas stream;
   ii) passing the contacted non-targeted component containing gas stream of step i) through a co-current phase separation step to produce both a non-targeted component containing solvent stream and a partially purified gas stream;
   iii) passing the partially purified gas stream of step ii) through an inline mass transfer step to produce a wet gas product, said mass transfer step comprising passing the partially purified gas stream through an inline mass transfer apparatus, in which it is contacted with a fine spray of additional fluid solvent; and
   iv) passing the wet gas product of step iii) through a final co-current phase separation step to produce a purified gas stream,
   wherein the method is performed in a subsea location.

2. The method according to claim 1, wherein the wet gas product of step iii) is passed through at least one further combination of a co-current phase separation step and an inline mass transfer step before proceeding to step iv).

3. The method according to claim 1, wherein the non-targeted components are carbon dioxide, hydrogen sulphide and/or other greenhouse gases.

4. The method according to claim 1, wherein the liquid solvent is water which has a pressure higher than atmospheric pressure.

5. The method according to claim 1, further comprising introducing fresh fluid solvent during each of steps ii), iii) and iv).

6. The method according to claim 1, wherein the partially purified gas stream of step (iii) is contacted with an alkylamine.

7. The method according to claim 1, wherein the non-targeted component containing solvent stream is injected into a natural or surface reservoir for sequestration purposes and/or enhanced oil and/or gas production purposes.

8. The method according to claim 1, wherein the fluid solvent stream is passed through one or more inline separation devices to remove solid non-targeted components from the fluid solvent stream prior to being contacted with the non-targeted component containing gas stream.

9. The method according to claim 1, wherein the non-targeted component containing solvent stream is injected into a methane hydrate reserve to produce methane and a hydrate.

10. The method according to claim 1, wherein the method further comprises the step of:
Separating the non-targeted component containing gas stream from a fluid stream by way of an initial co-current phase separation step in order to separate residual liquids and solids, prior to the step of:
Contacting the non-targeted component containing gas stream with a fluid solvent stream.

11. The method according to claim 10, wherein the separated residual liquids and solids undergo further phase separation to separate targeted liquids from produced water and/or sand before the targeted liquids are sent downstream for further processing and/or collection.

12. The method according to claim 1, wherein the co-current phase separation step and the final co-current phase separation step are all inline processes.

13. The method according to claim 12, wherein the inline co-current phase separation step ii) comprises passing the contacted non-targeted component containing gas stream through an inline co-current phase separation apparatus to separate the partially purified gas stream from the non-target component containing fluid solvent.

14. The method according to claim 1, wherein the non-targeted component containing solvent stream is released in deep water areas, so that the non-targeted components may be sequestered.

15. The method according to claim 14, wherein the non-targeted component containing solvent stream is progressively released over a length of pipeline.

16. A method for the removal of non-targeted components comprising greenhouse gases from a non-targeted component containing gas stream in an offshore subsea installation, the method comprising:
producing a contacted non-targeted component containing gas stream by combining the non-targeted component containing gas stream with a fluid solvent stream obtained from a subsea source;
after the producing, passing the contacted non-targeted component containing gas stream through a co-current phase separation to produce both a non-targeted component containing solvent stream and a partially purified gas stream;
after the passing, producing a wet gas product by passing the partially purified gas stream and a fine spray of fluid solvent through an inline mass transfer apparatus;
after the wet gas product is produced, passing the wet gas product through a final co-current phase separation to produce a purified gas stream; and
pumping the purified gas stream to a storage location.

* * * * *